Dec. 22, 1942.  L. I. KAPLAN ET AL  2,305,713
BROACH FOR RIFLE BARRELS
Filed Feb. 13, 1941  2 Sheets-Sheet 1
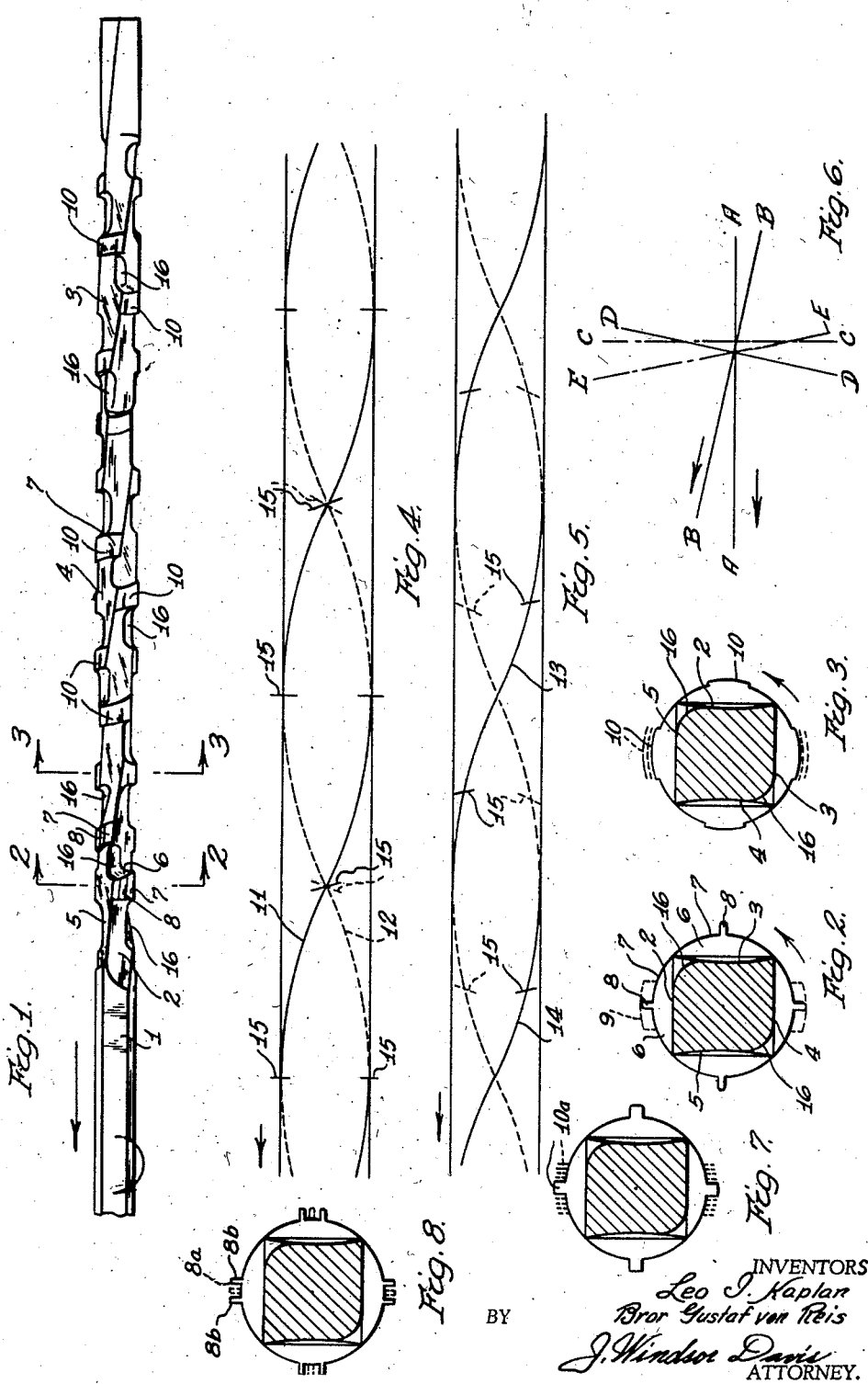
INVENTORS
Leo I. Kaplan
Bror Gustaf von Reis
BY J. Windsor Davis
ATTORNEY.

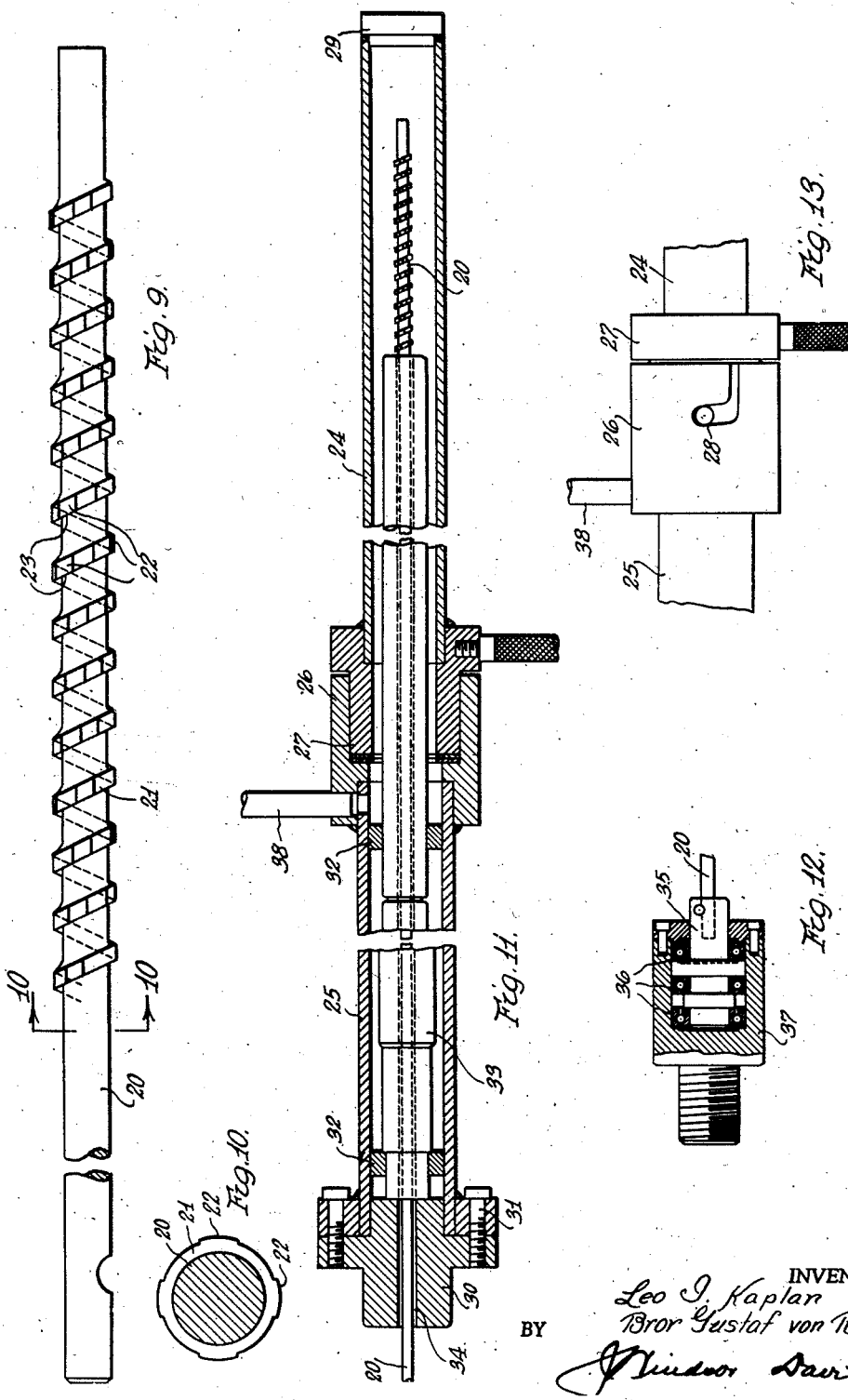

Patented Dec. 22, 1942

2,305,713

UNITED STATES PATENT OFFICE 2,305,713

BROACH FOR RIFLE BARRELS

Leo I. Kaplan and Bror Gustaf von Reis, Detroit, Mich., assignors to Detroit Broach Company, Detroit, Mich., a corporation of Michigan Application February 13, 1941, Serial No. 378,700

12 Claims. (Cl. 90—28.1)

This invention relates to broaches for forming spiral grooves on the inner surfaces of hollow or bored work pieces and has for its primary object to provide a broach capable of forming rifling, or spiral grooves, on the inner surface of the barrel of a fire arm.

More specifically, the main object is to provide a broach having a multiplicity of groups of cutters, with the cutters of each group spirally arranged so that each cutter follows a spiral path described by the first cutter of its group as the broach and work piece are relatively moved. That is, the work piece may be held stationary, in which case the broach is rotated simultaneously with its advancing movement, or the broach may be held stationary while the work is advanced lengthwise and simultaneously rotated. It is also possible, of course, that the broach may be moved lengthwise while the work is rotated, or the work may be moved lengthwise while the broach is rotated.

The successful use of a broach for rifling fire arm barrels, particularly rifle barrels, necessitates consideration of certain definite problems, which although not new in a broad sense, make necessary the construction of a broach embodying special characteristics. For example, because a rifle barrel is long and its bore comparatively small, say 20 to 30 inches in length and a bore approximately one quarter of an inch, the broach must be long and slender and it is difficult to prevent torsional distortion or "windup." If the broach is distorted torsionally, due to the normal tendency of a spiral set of cutters to move toward a straight line as a result of contact with the work, the spiral arrangement is destroyed and an accurate spiral groove cannot be formed. These same structural limitations make difficult the removal of chip.

To avoid torsional distortion of the broach, due to contact of the spiral groups of cutters with the work, the first cutter of each group is formed long and slender, in a diametric direction, and these cutters cut a comparatively deep, narrow groove. Rifle grooves, of course, do not exceed a few thousandths of an inch in depth, and by comparatively deep is meant the first cutters cut almost as deep as the final depth of the rifle groove. The deep, narrow grooves, formed by the first cutter of each group of cutters, may be formed without subjecting the broach to as much torsional distortion as would be the case if an equal amount of metal were removed by a wider and shallower cut, for the reason that the comparatively large side surfaces tend to guide the cutters or maintain their original spiral direction. The remaining cutters of the several groups which progressively increase in size to provide a groove of the desired dimensions follow in the spiral groove formed by the first cutter of their respective groups, and in this respect the groove acts in the nature of a guide by providing a path of lesser resistance for the following or trailing cutters. In this manner the tendency toward torsional distortion is reduced.

The invention provides for further reduction of the tendency toward torsional distortion by the particular angularity of the cutters. In this respect it is pointed out that it is standard practice to form the cutting edges in a lathe, in which case the cutting edges cross the axis of the broach at right angles, as the broach is viewed in side elevation, and cross an imaginary spiral line representing the spiral path of the cutter at an oblique angle. In other words, if the cutters are formed in a lathe they become automatically disposed at an oblique angle with respect to the spiral path of the broach such a condition being unavoidable. According to the present invention, however, the cutters when similarly viewed cross the axis of the broach at an oblique angle, which substantially increase the angularity of the cutter with respect to its spiral path. The result of this increased angularity is that each cutter produces a cam-like action or acts like a screw when it contacts the work, tending to rotate the tooth about the axis of the broach in a direction opposite to the direction of torsional distortion, and causing rotation of the broach as it is moved relative to the work.

With spiral groups of cutters in a broach meeting the above mentioned dimensional limitations, it becomes impossible to accommodate the chips by providing a continuous spiral groove in the land between the cutters, and to accommodate the chips, therefore, requires a special arrangement of flutes and cutters. The invention here disclosed teaches two alternative means for the accommodation of chips. In the first described form the broach might be visualized as comprising a body formed with a multiplicity of spiral flutes, like a drill for example, and having cutters arising at intervals from the bottom surface of each flute. With this arrangement each cutter unavoidably acts as an obstruction to the flute. The cutters, however, are staggered in the different flutes, and in advance of each cutter is a relief which enables the obstructed chips collecting in one flute in front of any cutter to shift to another flute, and when obstructed therein to shift to still another flute, and by passing through a series of flutes and reliefs to pass clear of the broach.

In the second described form the broach has a form resembling a twist drill having upstanding cutters arranged in groups, with the cutters of each group disposed on an imaginary spiral line. The cutting edges of the cutters so formed are automatically disposed at an angle corresponding to the pitch angle of the twist drill-like formation and, therefore, as they enter the work they act similarly to a screw and cause relative rotation between the cutter and the work.

The method of use of the broaches also constitutes an important feature of the invention. According to this invention the work piece is enclosed in a housing as the broach is moved therethrough. As the broach is moved through the bore in the work liquid is forced through the bore in the same direction that the broach is moved. As the broach completely fills the bore the liquid must necessarily flow through the grooves or flutes in the broaches and in addition to maintaining the work and the tool at a safe low temperature the liquid effectively removes the chips.

Other objects and advantages will become more fully apparent as reference is had to the accompanying drawings wherein our invention is illustrated, and in which Fig. 1 is a fragmental elevation of the broach, Fig. 2 is a section taken at a plane represented by line 2—2 of Fig. 1, Fig. 3 is a section taken at a plane represented by line 3—3 of Fig. 1, Figs. 4, 5 and 6 are diagrams used for purposes of explanation, Fig. 7 is a section similar to Fig. 3 illustrating the cutters enlarging progressively in a circumferential direction, Fig. 8 is a section illustrating a multiple arrangement of slender cutters, Fig. 9 is a side elevation of another form of broach, Fig. 10 is a section taken on the line 10—10 of Fig. 9, Fig. 11 is a longitudinal section of a housing and work support with which either form of broach may be used, Fig. 12 is a section illustrating a broach pulling head, and Fig. 13 is a fragmental elevation illustrating the means which detachably secures the housing sections together.

Referring to Figs. 1, 2 and 3, 1 designates an elongate broach body formed with four spiral flute-like formations 2, 3, 4 and 5. These flutes, although interrupted at intervals by cutter formations hereinafter described, might be visualized as being similar to the spiral flutes on a conventional drill. Arising at spaced intervals throughout the length of respective flutes 2, 3, 4 and 5 are projections 6 which support the cutters.

The projections 6 are integral with the broach body 1, of a width substantially equal to the width of the flutes when viewed in cross section, and have an arcuate surface 7 whose center of curvature is coincident with the axis of the broach body. The surfaces 7 constitute guide surfaces, and their radii vary, of course, according to the diameter of the bore in which the broach is intended to operate.

With four flutes as here shown there are four groups of projections 6, with the projections of each group arranged spirally one behind another. On each projection is integrally formed a cutter, which results in four groups of cutters with the several cutters of each group spirally arranged, one behind another.

The first cutter 8 of each spiral group is comparatively long, in a radial direction, and comparatively slender. As may be seen in Fig. 2, the cutters 8 extend radially a distance substantially equal to the depth of the groove to be formed, which groove is indicated by the dotted lines 9. The cutters 10, which follow behind respective first cutters 8, are the full width of the finished groove and of progressively increasing height.

As the broach is drawn through a bore in a work piece, and rotated simultaneously with its lengthwise movement, the first cutter 8 of each group cuts a comparatively narrow, comparatively deep spiral groove. This groove serves to guide the following cutters 10 in a spiral path, and reduces the tendency toward torsional distortion which would result in displacement of the following cutters from their correct spiral relationship with the other cutters of their respective group.

The diagrams of Figs. 4 and 5 illustrate the approximate relationship of the several groups of cutters, and also the relationship of the cutters of the several groups. In these views, the lines 11, 12, 13 and 14 represent the spiral paths through which respective groups of cutters move, the cutters being generally designated by the lines 15. The group of cutters arranged along the line 11 are arranged substantially diametrically opposite the cutters on the line 12, at spaced intervals throughout the length of the broach. The cutters on the line 13 are arranged substantially diametrically opposite cutters on the line 14, at intervals spaced lengthwise a distance equal or substantially equal to the distance between the cutters on the lines 11 and 12. The cutters 15 on all the lines 11, 12, 13 and 14 are relatively spaced lengthwise so that each diametrically opposite pair of cutters on the lines 11 and 12 is disposed midway between two diametrically opposite pairs of cutters on the lines 13 and 14.

It is apparent that the construction of the broach is such that the projections 6 which arise at spaced intervals from the bottom of the flutes 2, 3, 4 and 5 act to obstruct the continuous passage of chips through the flutes. In view of this condition, the broach body between the projections is relieved at 16, or, in other words, a portion of the body is removed at 16 to allow chips in the flute 2 to pass therefrom into the flute 3, and chips in the flute 4 to pass therefrom into the flute 5, as shown in Fig. 2. Similarly, as shown in Fig. 3, the removed portions enable chips to pass from the flute 5 into the flute 2 and from the flute 3 into the flute 4. The movement of the chips from one flute to another, to by-pass the projections 6, is caused by relative rotation between the broach and the work piece.

Fig. 6 diagrammatically illustrates the angularity of the cutters. In this diagram the line A—A represents the longitudinal axis along which the broach is moved lengthwise and simultaneously rotated. The line B—B represents the spiral path which a cutter follows during operation of the broach. The line C—C crosses the axis line A—A at right angles, and indicates the position of a cutter formed by a lathe in the usual manner. It will be noted that the line C—C crosses the line B—B at an oblique angle, and that this condition does not result because of intent to form an oblique angle with the line B—B, but rather because this condition is unavoidable. Therefore, lathe formed cutters, crossing the axis of the broach at right angles cross the spiral line at an oblique, not because the last named condition is the condition sought, but because it cannot be avoided. Spiral broaches have also been provided with cutters specially formed so that they cross the spiral line at right angles or as diagrammatically indicated by the line C—C which crosses the spiral line B—B at right angles therewith.

In the present case, however, the cutters are disposed at an angle approximately represented by the line E—E. It will be noted that the line E—E crosses the line A—A at an oblique angle, and that the angularity with respect to the spiral line B—B is materially increased over the angularity of the line C—C. The angularity of the teeth is increased to an extent such that they act similar to cams, tending to displace themselves sideways during functioning of the cutters.

It is obvious that as the broach is moved through the work piece it might be compared with a spiral spring in that the spirally arranged cutters tend to straighten into a straight line. The angularity of the cutters, with respect to their spiral paths, is such that the camming action counteracts the straightening tendency.

It is also apparent, as shown in Fig. 7, that the cutters instead of becoming progressively larger in a radial direction as indicated at 10 in Fig. 3, may become progressively larger in a circumferential direction as indicated at 10a in Fig. 7.

Fig. 8 illustrates a modified broach, or a construction of cutters which might be formed in the length of a broach such as above described, between the first cutters 8 and the enlarging cutters 10. The cutters 8a, indicated by dotted lines, form a comparatively deep and narrow spiral groove, in a manner identical to that above described. The broach is provided with additional comparatively long slender cutters 8b arranged to cut comparatively deep and narrow grooves in the work, parallel to the grooves formed by the cutters 8a. The grooves cut by the cutters 8a are within the confines of the final groove, and result in a further weakening of the stock and the formation of a path that the wider or high cutters, such as the cutters 10 or 10a, may follow without causing distortion of the broach body.

The actual depth of the grooves to be formed amounts to but a few thousandths of an inch, and in view of the difficulty in illustrating elements of such small dimensions, the proportions of the cutters have been greatly exaggerated in the drawings.

In Fig. 10 there is illustrated a broach 20 having a spiral rib 21 formed thereon and somewhat resembling a twist drill. Groups of cutters 22 are spirally arranged on the rib 21. The front or cutting edges 23 are thus disposed at an angle corresponding to the pitch angle of the rib and therefore as the broach is drawn through the bore in a work piece the cutting edges 23 set up a screw action which tends to cause relative rotation between the work and the tool.

In Fig. 11 there is illustrated a housing composed of two sections 24 and 25 having male and female coupling elements 26 and 27 adapted to be held in coupled relation by a bayonet slot and pin means 28 shown in Fig. 13. The outer end of the section 24 is closed by a plug 29, welded thereto, and the outer end of the section 25 is closed by a cap 30 removably secured thereto by bolts 31. Within the section 25 are supports 32 which support the gun barrel 33 coaxial with the housing. The broach 20 (or 1 as the case may be) extends through the barrel 33 and a central opening 34 in the cap 30.

The outer end of the broach is connected to a rotatable element 35 which is rotatably supported by thrust and radial anti-friction bearings 36 in a pulling head 37. As the head 37 pulls the broach through the work the broach is permitted to rotate, and the barrel is pressed tightly against the cap 30 which opposes the thrust of the broach. As the broach is thus moved liquid is forced into the housing 24, 25 through a supply pipe 38 and passes through the bore in the barrel and out of the housing through the opening 34 in the cap 30. This liquid cools the work and tool and washes all chips ahead of the broach, the liquid where it passes through the continuous groove formed by the rib 21 being passed across the face of each cutter in a manner to move the chips ahead of the cutters which form them.

What is claimed is:

1. A broach for forming a spiral groove of definite depth and width dimensions comprising a body formed with a group of cutters, the several cutters of the group being spirally arranged one behind another, the first cutter of the group being comparatively slender whereby it cuts a comparatively narrow groove and being of a height substantially equal to the depth dimension of the groove, and the remaining cutters being of a width substantially equal to the width dimension of the groove and progressively increasing in size to the depth dimension of the groove.

2. A broach comprising a body formed with a group of cutters arranged one behind another along an imaginary spiral line, the cutting edges of said cutters being disposed at an oblique angle to said imaginary line and to the direction of travel of the cutters whereby they produce a cam action through contact with a work piece tending to rotate the body in the direction of the spiral.

3. A broach comprising a body formed with a group of spirally arranged cutters, the cutting edges being disposed at an oblique angle with respect to the axis of the spiral with the angularity being such as to produce a rotating tendency in the direction of the spiral when the cutters contact a work piece.

4. A broach for forming a spiral groove of definite depth and width dimensions comprising a body formed with a group of cutters, the several cutters of the group being spirally arranged one behind another, the first cutters of the group being comparatively slender whereby it cuts a comparatively narrow groove and being of a height substantially equal to the depth dimension of the groove, the remaining cutters of the group progressively increasing in size, and the cutting edges of the cutters being disposed at an oblique angle with respect to the imaginary spiral line upon which the cutters are disposed, said angle being such that the cutters produce a rotating tendency in the direction of the spiral line and in a direction opposite to that of torsional distortion when the cutters contact a work piece.

5. A broach for forming a spiral groove of definite depth and width dimensions comprising a body formed with a group of cutters, the several cutters of the group being spirally arranged one behind another, the first cutter of the group being comparatively slender whereby it cuts a comparatively narrow groove and being of a height substantially equal to the depth dimension of the groove, the remaining cutters being of a width substantially equal to the width dimension of the groove and progressively increasing in size to the depth dimension of the groove, and the cutting edges of the cutters being disposed at an oblique angle with respect to the imaginary spiral line upon which the cutters are disposed, said angle being such that the cutters produce a rotating tendency in the direction of the spiral line when the cutters contact a work piece.

6. A broach for forming a multiplicity of spiral grooves of definite depth and width dimensions comprising a body formed with a plurality of groups of cutters, the several cutters of each group being spirally arranged one behind another, the first cutter of each group being comparatively long and slender whereby it cuts a comparatively narrow groove substantially equal to the depth dimension of the groove, and the remaining cutters of each group being of a width substantially equal to the width dimension of the groove and progressively increasing size in the direction of the depth of the groove.

7. A broach comprising a body formed with a multiplicity of spiral flute-like formations, projections arising at spaced intervals from the bottom of each flute-like formation, and a cutter on each projection, said body being relieved in front of each projection to enable chips to pass from one flute-like formation to another.

8. A broach comprising a body formed with a multiplicity of spiral flute-like formations, projections arising at spaced intervals from the bottom of each flute-like formation, each projection in each flute-like formation being arranged substantially diametrically opposite a projection in another flute-like formation, and constituting guides for the broach, and a cutter on each projection.

9. A broach comprising a body formed with a multiplicity of spiral flute-like formations, projections arising at spaced intervals from the bottom of each flute-like formation, each projection in each flute-like formation being arranged substantially diametrically opposite a projection in another flute-like formation, and constituting guides for the broach, and a cutter on each projection, said body being relieved in front of each projection to enable chips to pass from one flute-like formation to another.

10. A broach comprising a body formed with a multiplicity of flute-like formations, cutters arising from the bottom of said formation, said cutters being lengthwise spaced and arranged in spiral groups, and means for by-passing chips around the cutters of each group from one flute-like formation to another.

11. A broach comprising a body formed with a multiplicity of flute-like formations, cutters arising from the bottom of said formation, said cutters being lengthwise spaced and arranged in spiral groups, means for by-passing chips around the cutters from one flute-like formation to another, the first cutter of each group being comparatively slender whereby it cuts a comparatively narrow groove and being of a height substantially equal to the depth of the groove, and the remaining cutter of each group progressively increasing in size.

12. A broach comprising a body formed with a multiplicity of flute-like formations, cutters arising from the bottom of said formation, said cutters being lengthwise spaced and arranged in spiral groups, means for by-passing chips around the cutters from one flute-like formation to another, the first cutter of each group being comparatively slender whereby it cuts a comparatively narrow groove and being of a height substantially equal to the depth of the grove, and the remaining cutters of each group being of substantially uniform width and of progressively increasing height.

BROR GUSTAF VON REIS.
LEO I. KAPLAN.